United States Patent [19]

Kyle

[11] Patent Number: 4,629,858
[45] Date of Patent: Dec. 16, 1986

[54] METHOD FOR ENGRAVING CARPET AND CARPET SO ENGRAVED

[75] Inventor: Joseph H. Kyle, LaGrange, Ga.

[73] Assignee: Interface Flooring Systems, Inc., LaGrange, Ga.

[21] Appl. No.: 560,930

[22] Filed: Dec. 12, 1983

[51] Int. Cl.⁴ .............................................. B23K 26/00
[52] U.S. Cl. ....................... 219/121 LJ; 219/121 LM; 219/121 LV; 264/293; 264/324; 26/9; 26/69 B
[58] Field of Search .... 219/121 L, 121 LM, 121 LH, 219/121 LY, 121 LE, 121 LF, 121 LU, 121 LV, 121 LW, 121 LX, 121 FS; 264/324, 293; 26/15 R, 16, 69 B, 9, 13

[56] References Cited

U.S. PATENT DOCUMENTS

| | | |
|---|---|---|
| 647,474 | 4/1900 | Cameron . |
| 3,256,581 | 6/1966 | Thal et al. .................................. 26/2 |
| 3,523,345 | 8/1970 | Hughes ........................ 249/121 LM |
| 3,761,675 | 9/1973 | Mason et al. ......................... 219/121 |
| 3,784,183 | 1/1974 | Castro et al. ........................... 269/20 |
| 4,139,409 | 2/1979 | Macken et al. ....................... 156/634 |
| 4,271,568 | 6/1981 | Durville et al. ........................... 26/9 |

Primary Examiner—M. H. Paschall
Attorney, Agent, or Firm—Kilpatrick & Cody

[57] ABSTRACT

Methods for engraving carpet with beams of radiant energy. A beam of radiant energy, such as a laser beam, is intermittently directed at the surface of carpet to engrave the surface, and, if desired, to cause certain color changes. During the intermittent operation of the beam, the carpet is indexed to allow the beam to engrave designs. Alternatively, the beam may be indexed in relation to stationary carpet by means of lenses or mirrors to engrave designs. The method allows inexpensive and accurate engraving of carpet surfaces by which intricate designs may be formed on those surfaces in a minimum amount of time.

6 Claims, 6 Drawing Figures

METHOD FOR ENGRAVING CARPET AND CARPET SO ENGRAVED

BACKGROUND OF THE INVENTION

This invention relates to a method and apparatus for imparting decorative engraving to the pile surface of carpet.

Numerous methods have been devised to decorate or place designs on carpet. Carpets have been dyed in varying colors subsequent to tufting or weaving to form designs, and yarns of varying colors have been interwoven or tufted in various patterns to form such designs. Yarns of varying lengths have been tufted into backing to vary the texture or shape of the surface of carpet. Each of these methods results in certain inefficiencies. A complex means is required to apply different dyes, to tuft or weave different color yarns, or to cut or tuft different lengths of yarn or pile at different points on the surface of the carpet.

Lasers have previously been used to cut textile materials, such as cloth for garments, and to "machine" various patterns and forms in wood, metals and similar materials.

SUMMARY OF THE INVENTION

According to the present invention, a beam of radiant energy in the form of a laser beam is intermittently directed at the surface of the carpet to engrave the surface, and, if desired, to cause certain color changes. Unexpectedly, such a laser beam can impart a very attractive pattern on the pile surface of carpet. During the intermittent operation of the laser beam, the carpet is indexed in an X and a Y direction to allow the laser beam to engrave designs. Alternatively, the laser beam may be indexed in relation to stationary carpet by means of lenses or mirrors to engrave designs.

It is therefore an object of the present invention to provide a method for inexpensively and quickly placing designs on the surface of carpet by engraving the surface of such carpet with a beam of coherent light.

It is another object of the present invention to provide a method in which the surface of carpet may be engraved, and the texture thereby changed, to form more intricate designs than it has previously been possible to impart to carpet and to do so in a minimum amount of time.

It is a further object of the present invention to provide a method in which designs of varying colors or hues may be produced on carpet inexpensively and quickly with a beam of coherent light.

Other objects of the present invention will become apparent during the course of the following description.

DETAILED DESCRIPTION OF THE DRAWINGS

Figure 1:
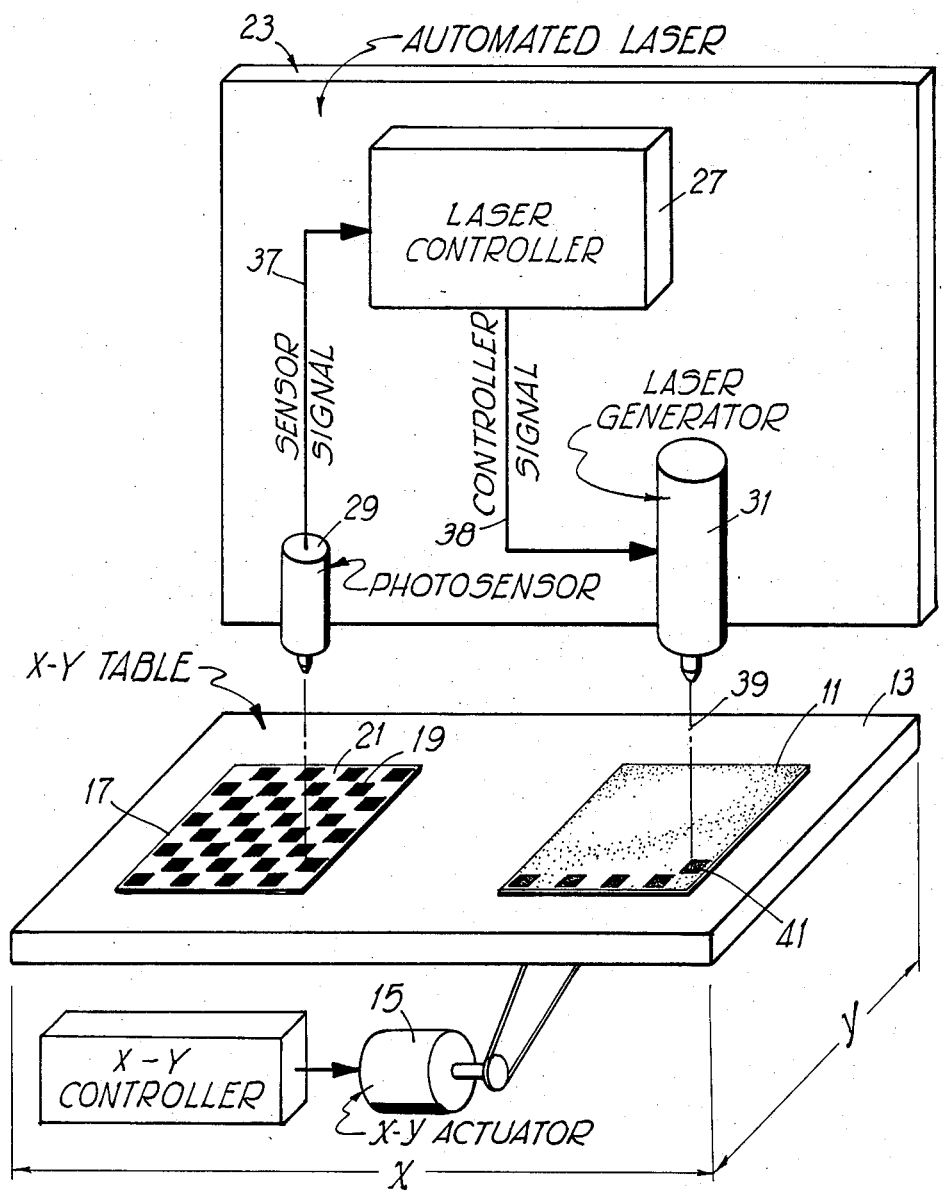
FIG. 1 is a schematic view showing apparatus for practicing one method of engraving carpet according to the present invention.
Figure 2:
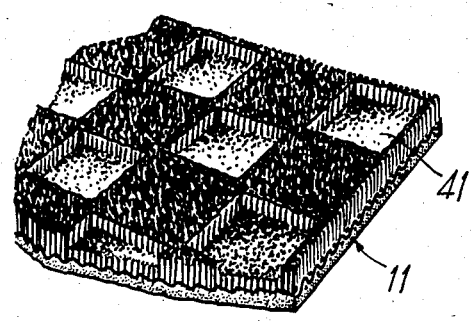
FIG 2 is a perspective, partial cutaway view showing carpet engraved according to the method of FIG. 1.
Figure 3:
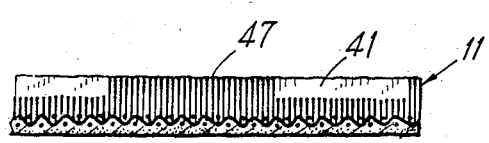
FIG. 3 is a side cross section view showing carpet engraved according to the method of FIG. 1.
Figure 4:
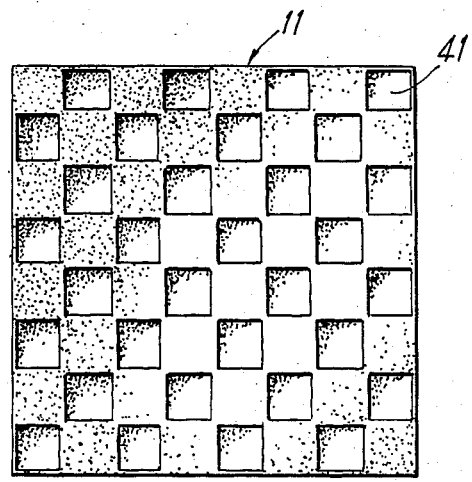
FIG. 4 is a plan view showing carpet engraved according to the method of FIG. 1.

FIG. 1 shows apparatus for practicing one method of engraving carpet according to the present invention. A section of substrate 11, or carpet, is placed upon an X-Y table 13. Such X-Y tables are well known in the art of carpet manufacture, and have been used for, among other things, dying carpet. X-Y table 13 provides a surface which may be moved or indexed in a horizontal "X" direction and a horizontal "Y" direction, as shown in FIG. 1, by X-Y actuator 15. In the depicted method of the present invention, the rate of indexing in both the X and Y directions may be adjusted.

Also placed on the X-Y table is a pattern 17. Pattern 17 in the depicted method is a paper sheet having a design or designs 19. Designs 19 may be printed, drawn, photocopied or placed by any other appropriate method onto pattern 17. Designs 19 must contrast with the fields 21 or remainder of pattern 17 to be easily detected by a photosensing means. Pattern 17 is oriented parallel to substrate 11, so that each point on pattern 17 has a spatially corresponding point on substrate 11.

Located above the X-Y table, according to the depicted method of the present invention, is an automated laser 23. Automated laser 23 may be any laser whose operation is controllable by a photosensing means, or by any other appropriate input signal. In the preferred method of the present invention, automated laser 23 is a Model 580 80-watt continuous wave carbon dioxide laser manufactured by Laser Machining, Inc. of Somerset, Wis. Automated laser 23 comprises generally a controller 27 which receives signals from a photosensor 29 and processes those signals to activate and deactivate a laser generator 31. According to the preferred method, the power of laser generator 31 may be adjusted to produce the desired level of engraving of substrate 11.

According to the depicted method of the present invention, after the substrate 11 and the pattern 17 are placed on the X-Y table 13, X-Y table actuator 15 indexes X-Y table 13, and both substrate 11 and pattern 17, along the X axis of X-Y table 13. As substrate 11 and pattern 17 move along the X axis, photosensor 29 detects the presence or absence of designs 19 on pattern 17. Controller 27 receives sensor signals 37 from photosensor 29 and sends controller signal 38 to activate or deactivate laser generator 31. Laser generator 31 thus intermittently emits a coherent beam of light, or laser beam 39, which cuts, burns or engraves one line of engravings 41 into substrate 11 corresponding to one line along the X axis in designs 19 on pattern 17. As the edge of substrate 11 is reached, the X-Y table 13 indexes substrate 11 and pattern 17 over one line width along the Y axis and then begins indexing once again in the X or negative X direction. In this fashion, engravings 41 are engraved into substrate 11 corresponding to designs 19 on pattern 17.

This invention is particularly useful for imparting decoration to carpet tiles. In the preferred embodiment, designs are fused into the surface of eighteen inch square tile substrate 11 having nylon filament pile. Of course, the method of this invention can be used to impart designs to other synthetic or natural pile material. If yarn 47 has a high residual of extractables, or spin finishing, then the engravings 41 tend to be lighter in hue that the color of the substrate, or are white. Moisturizing the substrate 11 before engraving also affects end point definition of yarn 47 and engravings 41, by causing yarns 47 to fuse together more than they do in the absence of moisture. Prior to being placed on X-Y table 13, substrate 11 may be dipped in water or other solution and thus moisturized. It is generally true that heat treated yarns do not change hue as readily as non-heat treated yarns in this method, and their end point definition is not so greatly affected.

Figure 5:
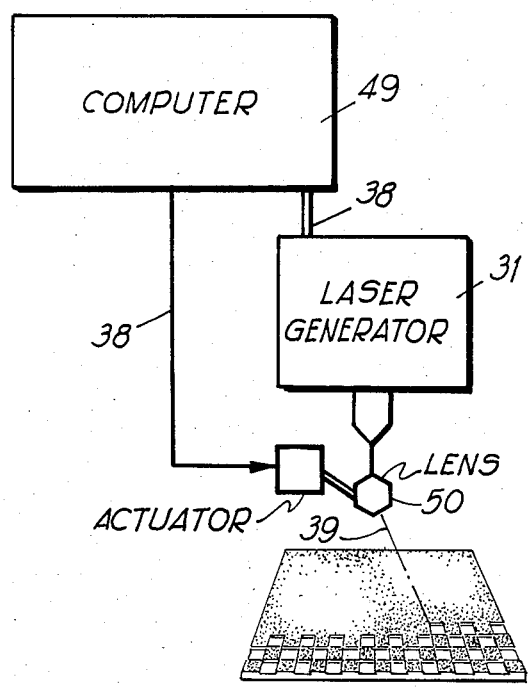
FIG. 5 is a schematic view showing apparatus for practicing another method of engraving carpet according to the present invention, which an optical device comprising at least one lens directs the laser beam onto the surface of the carpet.
Figure 6:
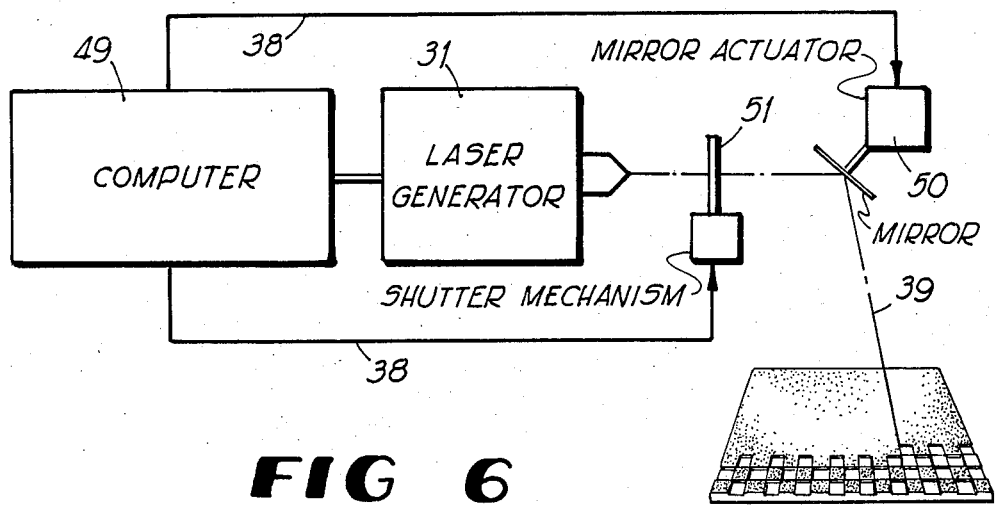
FIG. 6 is a schematic view showing apparatus for practicing a third method of engraving carpet according to the present invention, in which an optical device comprising mirrors directs laser beam onto the carpet, and a shutter interrupts the laser beam.

An alternative method of the present invention for engraving carpet involves moving the laser beam 39 relative to the substrate 11, or moving both laser beam 39 and substrate 11 as described above. Referring to FIG. 5, a computer 49 coordinates the movement of an optical device 50 comprising mirrors, lenses or both, and also activation of the laser generator 31. Alternatively, as depicted in FIG. 6, computer 49 interrupts the laser beam by means of a mechanical shutter 51 interposed in the beam's path. Computerized control of laser beam 39 to engrave substrate 11 may be accomplished according to this method with the use of apparatus as disclosed in U.S. Pat. No. 3,761,675 issued Sept. 25, 1973 to Mason, et al., entitled "Material Cutting and Printing System," which patent is incorporated herein by this reference as if set forth fully herein.

The foregoing description of this invention is for purposes of explanation and illustration. It will be apparent to those skilled in the relevant art that modifications and changes may be made to the invention as thus described without departing from its scope and spirit.

I claim:

1. A method for engraving carpet, comprising the steps of:
   (a) providing a section of carpet;
   (b) moistening the section of carpet with water;
   (c) providing a laser generator;
   (d) orienting the laser generator so that its beam will impinge upon the section of carpet;
   (e) allowing the laser beam to impinge upon the section of carpet according to a predetermined timing sequence; and
   (f) moving the section of carpet relative to the laser beam according to a predetermined pattern.

2. The method of claim 1 wherein said laser generator is a low power laser generator.

3. The method of claim 1 wherein said laser generator is a carbon dioxide laser generator.

4. The method of claim 1 wherein said laser generator is a continuous wave laser generator.

5. A method for imparting a desired pattern to the pile surface of a textile material, comprising the steps of:
   (a) placing the textile material in the path of a laser; and
   (b) moving the textile material and the laser relative to one another in at least two directions perpendicular to one another according to a predetermined sequence while selectively activating and deactivating the laser to illuminate portions of the pile in the path of the activated laser, in order to impart an aesthetically pleasing appearance to the pile surface by fusing, changing the appearance and reducing the pile height of portions of the pile corresponding to the desired pattern.

6. Carpet engraved according to the method of any one of claims 1, 2, 3, 4 or 5.

* * * * *